(12) United States Patent
Devling et al.

(10) Patent No.: US 9,036,791 B2
(45) Date of Patent: May 19, 2015

(54) TELEPHONE SYSTEM HAVING ALERT MODULE

(71) Applicant: Midland Radio Corporation, Kansas City, MO (US)

(72) Inventors: Daniel M. Devling, Liberty, MO (US); Guido Izhak Raccah, Hong Kong (HK)

(73) Assignee: Midland Radio Corporation, Kansas City, MO (US)

( * ) Notice: Subject to any disclaimer, the term of this patent is extended or adjusted under 35 U.S.C. 154(b) by 0 days.

(21) Appl. No.: 13/906,053

(22) Filed: May 30, 2013

(65) Prior Publication Data

US 2013/0322606 A1    Dec. 5, 2013

Related U.S. Application Data

(60) Provisional application No. 61/654,051, filed on May 31, 2012.

(51) Int. Cl.
*H04M 11/04* (2006.01)
*H04M 1/725* (2006.01)

(52) U.S. Cl.
CPC .......... *H04M 11/04* (2013.01); *H04M 1/72536* (2013.01); *H04M 1/72569* (2013.01)

(58) Field of Classification Search
None
See application file for complete search history.

(56) References Cited

U.S. PATENT DOCUMENTS

| | | | |
|---|---|---|---|
| 5,444,433 A | 8/1995 | Gropper | |
| 5,541,980 A * | 7/1996 | Urewicz | 455/404.1 |
| 6,204,761 B1 | 3/2001 | Vanderable | |
| 7,233,781 B2 | 6/2007 | Hunter et al. | |
| 7,333,806 B2 | 2/2008 | Kingsolver et al. | |
| 2003/0095639 A1 | 5/2003 | Vinson | |
| 2003/0174817 A1 | 9/2003 | Luneau et al. | |
| 2003/0179089 A1 | 9/2003 | Sweatt | |
| 2004/0058640 A1 | 3/2004 | Root et al. | |
| 2007/0049259 A1* | 3/2007 | Onishi et al. | 455/414.2 |
| 2007/0078822 A1* | 4/2007 | Cucerzan et al. | 707/3 |
| 2010/0273457 A1* | 10/2010 | Freeman et al. | 455/412.2 |
| 2011/0130113 A1* | 6/2011 | Takuno | 455/404.1 |

\* cited by examiner

*Primary Examiner* — Duc Nguyen
*Assistant Examiner* — Assad Mohammed
(74) *Attorney, Agent, or Firm* — Lathrop & Gage LLP

(57) ABSTRACT

One telephone system embodiment having an alert module includes a base unit and at least one handheld unit. The base unit has a processor in data communication with a telephone network interface, a radio receiver, a first local transmitter, a first local receiver, and a first computer memory having a first program. The handheld unit has a processor in data communication with a second local receiver, a second local transmitter, a microphone, a speaker, and a second computer memory having a second program. At least one of the first and second programs includes instructions for passing signals between a telephone network on one end and the microphone and the speaker on another end. At least one of the first and second programs includes instructions for presenting an emergency warning through the speaker upon receipt of alert data from an emergency broadcast radio transmitter.

18 Claims, 4 Drawing Sheets

TELEPHONE SYSTEM HAVING ALERT MODULE

RELATED APPLICATIONS

This application claims priority to provisional application 61/654,051 filed May 31, 2012, the disclosure of which is incorporated herein in its entirety by reference.

BACKGROUND

According to the National Oceanic and Atmospheric Administration (NOAA), there is a continued increase in the severity of weather-related impacts. See http://www.nws-.noaa.gov/com/weatherreadynation/faqs.html. For example, a growing population and trends such as urban sprawl and conversion of rural land to suburban landscapes increase the likelihood a tornado will impact densely populated areas. Id. And enhanced overlap in the U.S. economy means that a single weather event can have a significant effect on several industries. Id. The current invention relates to devices that warn of emergency situations, such as those caused by weather events.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, a telephone system having an alert module includes a base unit and at least one handheld unit. The base unit has a processor in data communication with a telephone network interface, a radio receiver, a first local transmitter, a first local receiver, a first computer memory having a first program, and a first display. The handheld unit has a processor in data communication with a second local receiver, a second local transmitter, a microphone, a speaker, a second computer memory having a second program, and a second display. At least one of the first and second programs includes instructions for actuating the telephone network interface, the first local transmitter, the first local receiver, the second local transmitter, and the second local receiver to pass signals between a telephone network on one end and the microphone and the speaker on another end. At least one of the first and second programs includes instructions for actuating the radio receiver, the first display, the first local transmitter, the second local receiver, the second display, and the speaker for presenting an emergency warning through the first display, the second display, and the speaker upon receipt of alert data from an emergency broadcast radio transmitter.

According to another embodiment, a telephone system having an alert module includes a base unit and at least one handheld unit. The base unit has a processor in data communication with a telephone network interface, a radio receiver, a first local transmitter, a first local receiver, and a first computer memory having a first program. The handheld unit has a processor in data communication with a second local receiver, a second local transmitter, a microphone, a speaker, and a second computer memory having a second program. At least one of the first and second programs includes instructions for passing signals between a telephone network on one end and the microphone and the speaker on another end using the telephone network interface, the first local transmitter, the first local receiver, the second local transmitter, and the second local receiver. At least one of the first and second programs includes instructions for utilizing the radio receiver, the first local transmitter, the second local receiver, and the speaker for presenting an emergency warning through the speaker upon receipt of alert data from an emergency broadcast radio transmitter.

According to still another embodiment, a telephone system having an alert module includes a base unit and at least one handheld unit. The base unit has a processor in data communication with a telephone network interface, a radio receiver, a first local transmitter, a first local receiver, a first computer memory, and a first display. The handheld unit has a processor in data communication with a second local receiver, a second local transmitter, a microphone, a speaker, and a second computer memory. Machine-readable instructions cause at least one of the processors to pass signals between a telephone network on one end and the microphone and the speaker on another end using the telephone network interface, the first local transmitter, the first local receiver, the second local transmitter, and the second local receiver. Machine-readable instructions cause the first display to present an emergency warning upon the radio receiver receiving alert data from an emergency broadcast radio transmitter.

DETAILED DESCRIPTION

Figure 1:
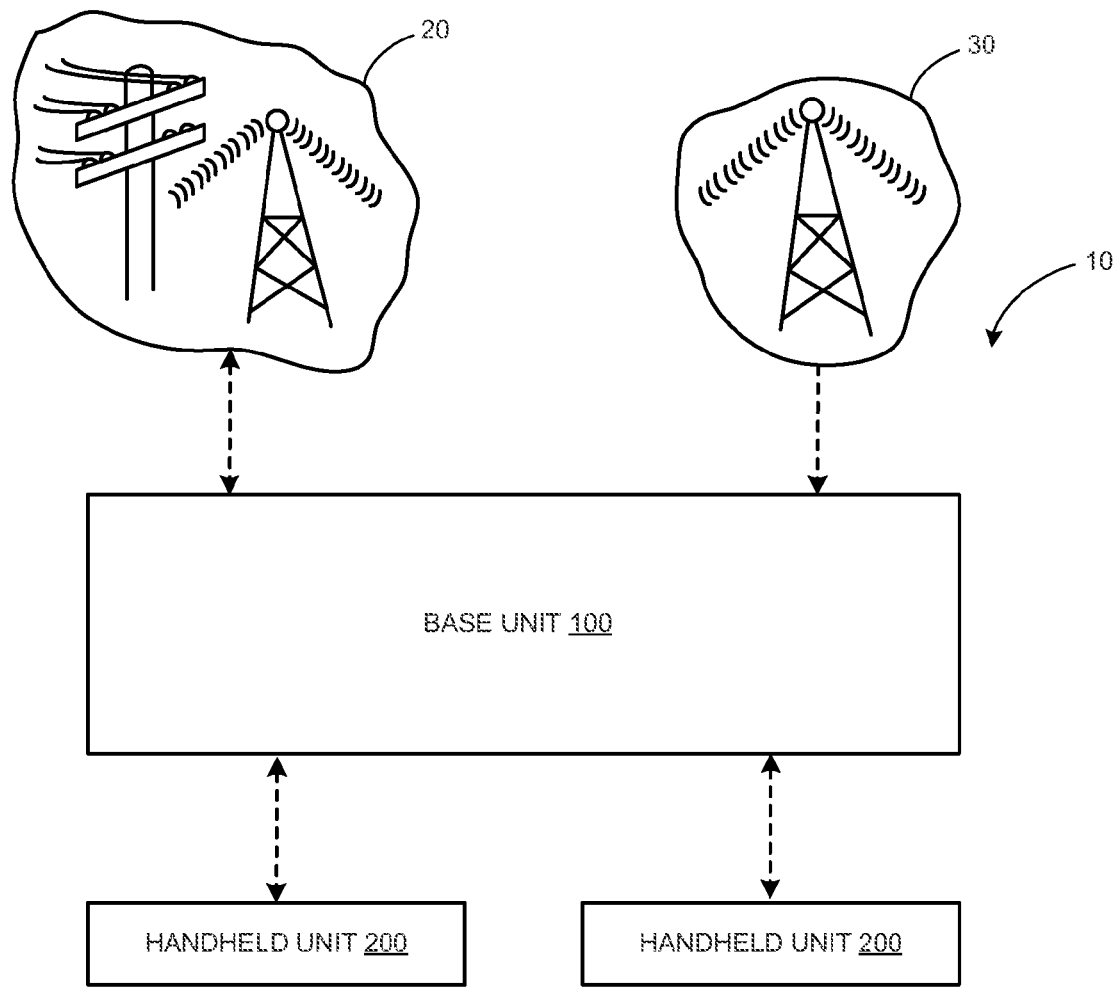
FIG. 1 illustrates a telephone system having alert module, according to one embodiment of the invention, in use with a telephone network and a radio transmitter.

FIGS. 1 through 4 illustrate a telephone system having alert module 10, according to one embodiment. The system 10 includes a base unit 100 and at least one handheld unit 200. The base unit 100 and the handheld unit(s) 200 may be configured to have various external configurations, and in some embodiments one or more of the handheld units 200 may be selectively coupled to the base unit 100 (e.g., for storage or charging).

Figure 2:
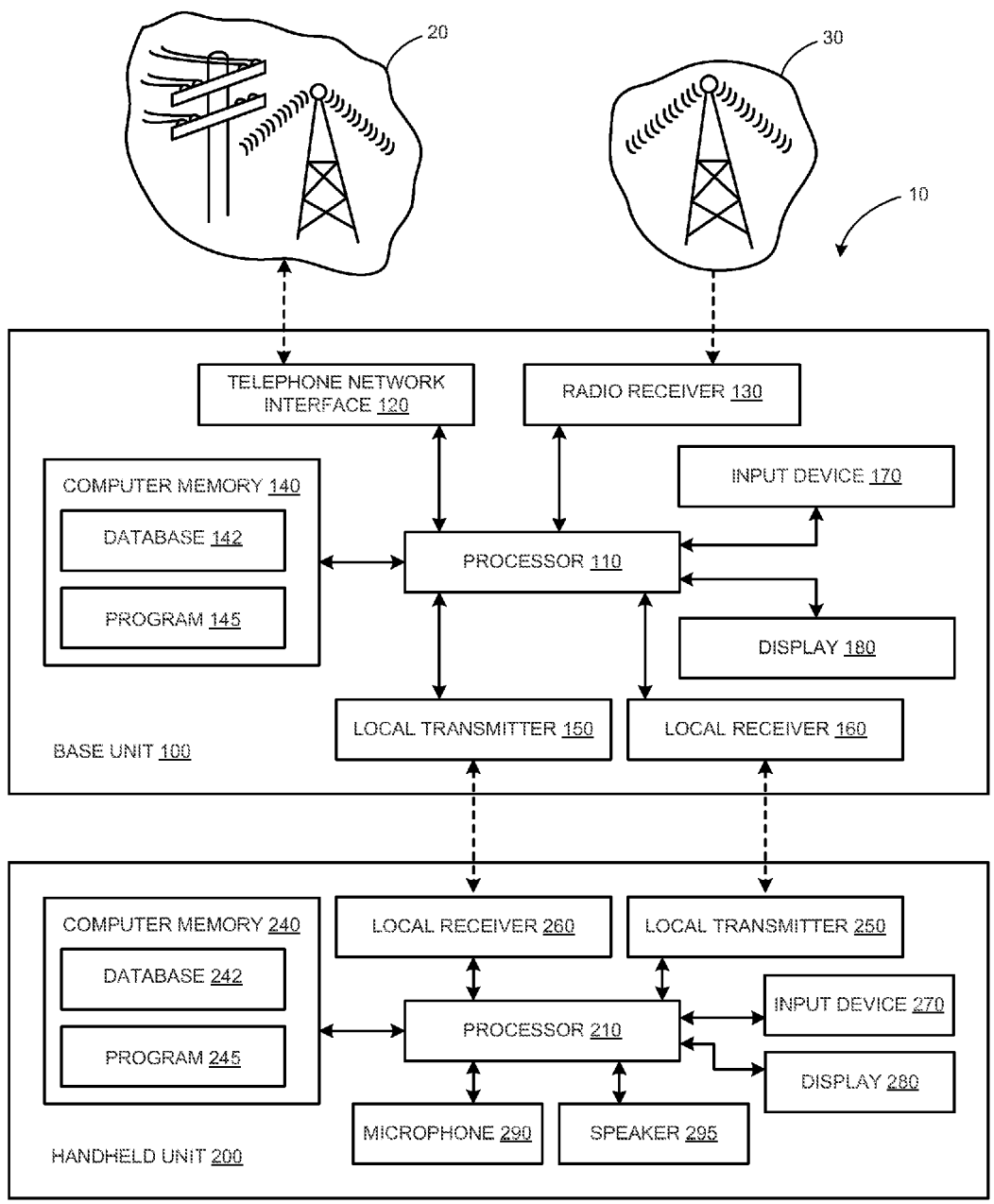
FIG. 2 is a block diagram showing components of the telephone system having alert module of FIG. 1, in use with the telephone network and the radio transmitter of FIG. 1.

The base unit 100 includes a processor 110 (which may be a single processor or multiple processors in communication with one another) in data communication with various elements, such as those shown in FIG. 2. A telephone network interface 120 in communication with the processor 110 may allow users of the system 10 to communicate with third parties through a telephone network 20 (e.g., one or more of a traditional landline telephone system, a cellular telephone system, a satellite telephone system, a VoIP system, et cetera) using one of the handheld units 200 as described further below.

A radio receiver 130 may be configured to receive, amplify, and demodulate radio waves from at least one radio transmitter 30 at one or more radio frequency used for emergency broadcasts (e.g., from 162.400 to 162.550 MHz), and to provide the demodulated radio waves to the processor 110. Any such radio receiver 130, whether now known or later developed, may be used, and some of the functionality of the radio receiver 130 may be performed by the processor 110.

The processor 110 is additionally in data communication with non-transitory computer memory 140 having a database 142 and programming 145. As will be appreciated by those skilled in the art, the computer memory 140 may consist of any appropriate computer-storage media (e.g., RAM, ROM, EEPROM, flash memory, et cetera) and the database 142 may be any electronic file or combination of electronic files in which data is stored for use by the processor 110. The program 145 is described in further detail below, with specific reference to FIG. 3.

A input device 170 (e.g., one or more button, knob, microphone, et cetera) may be in data communication with the processor 110 for providing data from the user to the processor 110, and a display 180 (e.g., a visual display and/or a speaker) may be in data communication with the processor 110 for providing data from the processor 110 to the user.

Still further, a local transmitter 150 and a local receiver 160 may be in data communication with the processor 110 to communicate with the handheld unit(s) 200—and specifically with a local receiver 260 and a local transmitter 250 of each handheld unit 200. The local transmitters and receivers 150, 250, 160, 260 may utilize any appropriate wireless communication technology, whether now known or later developed. Example technology includes 900 MHz, 1.9 GHz, 2.4 GHz, 5.8 GHz band transmitters/receivers and Bluetooth transmitters/receivers.

Turning to the handheld unit(s) 200, each handheld unit 200 includes a processor 210 (which may be a single processor or multiple processors in communication with one another) in data communication with the local transmitter 250 and the local receiver 260. Computer memory 240, an input device 270, a display 280, a microphone 290, and a speaker 295 may also be in data communication with the processor 210, as shown in FIG. 2. The non-transitory computer memory 240 has a database 242 and programming 245. As with the computer memory 140, the computer memory 240 may consist of any appropriate computer-storage media (e.g., RAM, ROM, EEPROM, flash memory, et cetera) and the database 242 may be any electronic file or combination of electronic files in which data is stored for use by the processor 210. The program 245 is described in further detail below, with specific reference to FIG. 4.

The input device 270 (e.g., one or more button, knob, microphone, et cetera) may be in data communication with the processor 210 for providing data from the user to the processor 210, and the display 280 (e.g., a visual display and/or a speaker) may be in data communication with the processor 210 for providing data from the processor 210 to the user.

The microphone 290 and the speaker 295 may allow data to be input to the system 10 for transmission to the telephone network 20 and presented from the telephone network 20 at the handheld unit 200, respectively.

Figure 3:
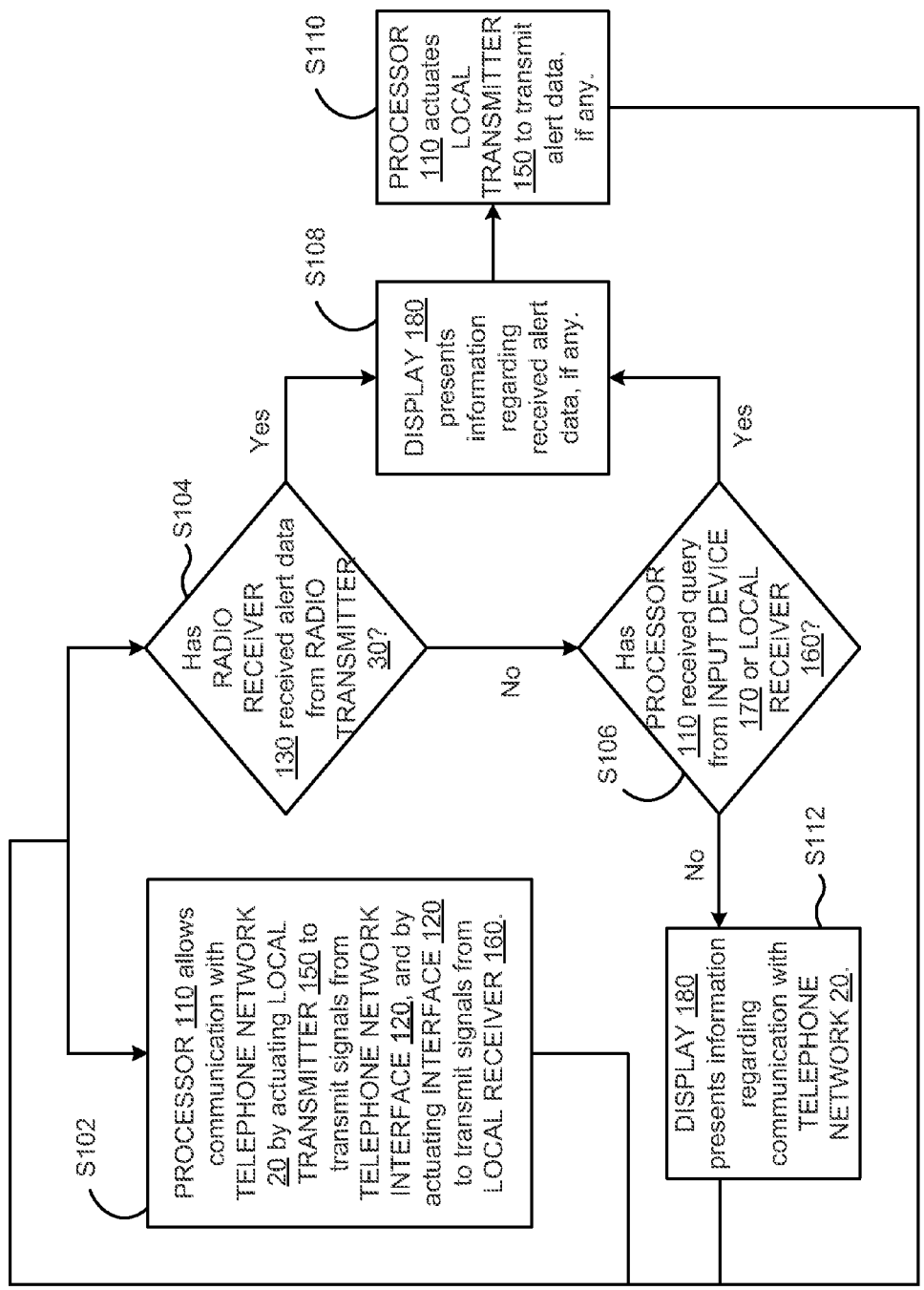
FIG. 3 is a flow chart showing an exemplary set of steps performed by the telephone system having alert module of FIG. 1.
Figure 4:
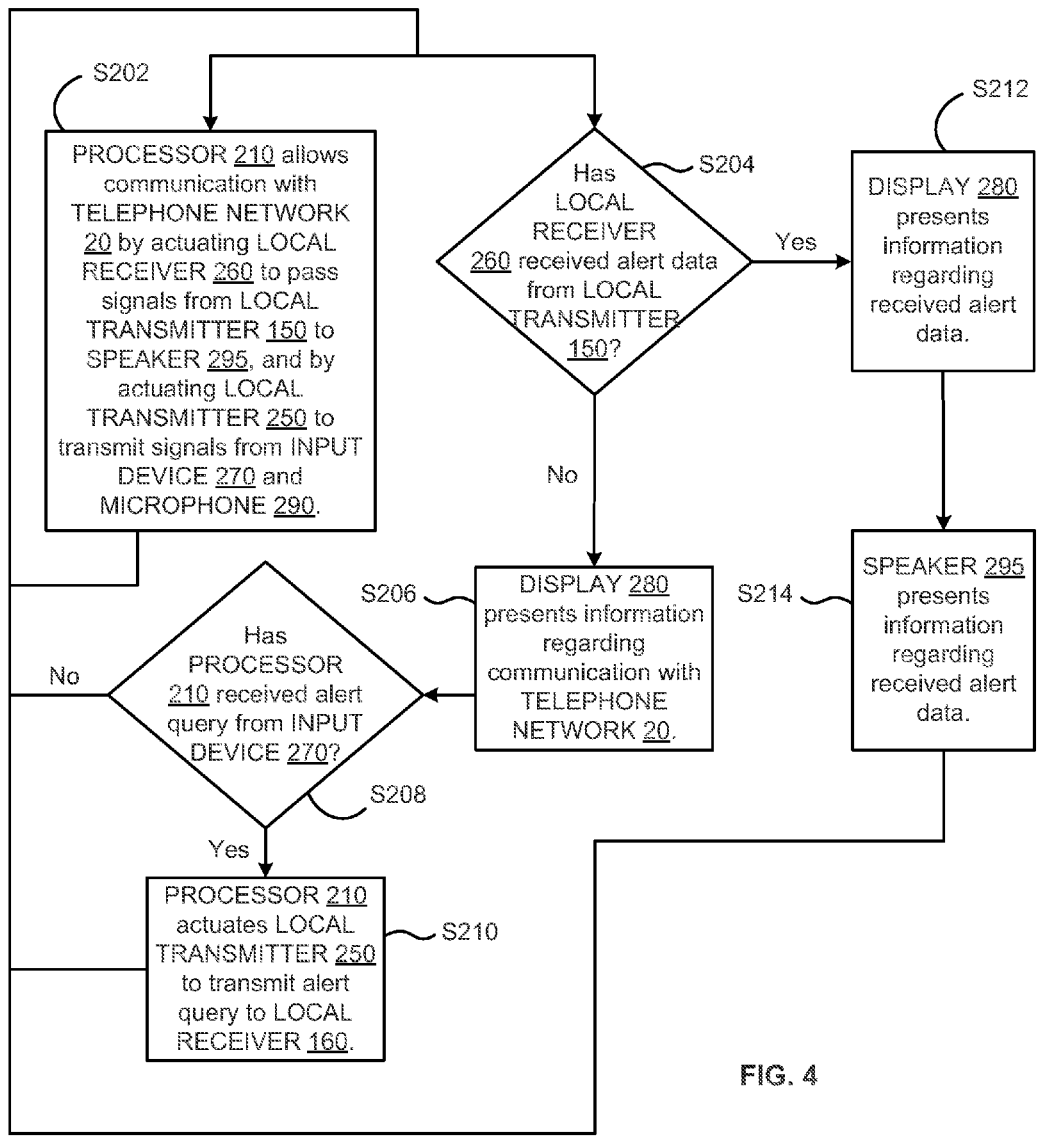
FIG. 4 is a flow chart showing another exemplary set of steps performed by the telephone system having alert module of FIG. 1.

The programming 145, 245 causes the processors 110, 210 to undertake various steps for controlling communication between the system 10 and the telephone network 20, and between the system 10 and the radio transmitter 30, such as shown in FIGS. 3 and 4. Those skilled in the art will appreciate that various steps shown and described can occur in different orders, and that some steps may be omitted or combined.

At step S102 of FIG. 3, the programming 145 causes the processor 110 to allow communication between the system 10 and the telephone network 20 by actuating local transmitter 150 to transmit signals from telephone network interface 120, and by actuating interface 120 to transmit signals from local receiver 160. While step S102 occurs, the programming 145 may simultaneously direct the processor 110 to step S104.

At step S104, the processor 110 determines if the radio receiver 130 has received alert data from the radio transmitter 30. If so, the processor is directed to step S108; if not, the processor proceeds to step S106. At step S106, the processor 110 determines if a query has been received from the input device 170 or the local receiver 160. If so, the processor is directed to step S108; if not, the processor continues to step S112.

At step S112, the display 180 presents information regarding communication with the telephone network 20, such as a phone number and/or name of a person on the network 20 communicating with the system 10. From step S112, the processor 110 is directed to step S104 (and continues to perform step S102).

Returning to step S108, the display 180 presents information regarding any received alert data, and the processor 110 proceeds to step S110 where it actuates the local transmitter 150 to transmit any alert data received from the radio transmitter 30. In some embodiments, the specific received alert is presented and transmitted, while in other embodiments predetermined messages (e.g., from database 142) are correlated to the received alerts and then presented and transmitted. If step S108 is reached through step S106 instead of through step S104, the information presented and transmitted may vary. For example, filters may be pre-established to provide only certain types of warnings automatically (i.e., if step S108 is reached directly from step S104), while additional warnings or a status indication may be provided if step S108 is reached from step S106. The processor 110 continues from step S110 to step S104 (and continues to perform step S102).

Focusing now on FIG. 4, which illustrates various aspects of the programming 245, the processor 110 at step S202 allows communication with the telephone network 20 by actuating the local receiver 260 to pass signals from the local transmitter 150 to the speaker 295, and by actuating the local transmitter 250 to transmit signals from the input device 270 and the microphone 290. While step S202 occurs, the programming 245 may simultaneously direct the processor 210 to step S204.

At step S204, the processor 210 determines whether the local receiver 260 has received alert data from the local transmitter 150. If so, the processor 210 continues to step S212; if not, the processor 210 is directed to step S206.

At step S206, the display 280 presents information regarding communication with telephone network 20 (e.g., a phone number and/or name of a person on the network 20 communicating with the system 10, a duration of a telephone call, et cetera). From step S206, the processor 210 is directed to step S208 where it determines whether an alert query from the input device 270 has been received. If not, the processor 110 is directed to step S204 (and continues to perform step S202). If so, the processor 210 actuates the local transmitter 250 at step S210 to transmit the alert query to the local receiver 160 and is then directed to step S204 (and continues to perform step S202).

Returning now to step S212, the processor 210 actuates the display 280 to present information regarding the received alert data. In some embodiments, the specific received alert is presented, while in other embodiments predetermined messages (e.g., from database 242) are correlated to the received alerts and then presented.

After step S212 in the embodiment 10, the processor 210 actuates the speaker 295 to present information regarding the received alert data at step S214. Similar to step S212, in some embodiments the specific received alert is presented, while in other embodiments predetermined messages (e.g., from database 242) are correlated to the received alerts and then presented. The speaker 295 may be interrupted from presenting audio from the telephone network 20 to provide the alert at step S214, or may present the alert simultaneously with the audio from the telephone network 20. The programming 245 directs the processor 210 from step S214 to step S204, and the processor 210 continues to perform step S202.

So, as will be clear to those skilled in the art from the accompanying drawings and the foregoing description, the system 10 allows telephone calls to be made between one or more of the handheld units 20 and one or more party on the telephone network 20, and also allows emergency data from the radio transmitter 30 to be presented at the base unit 100 and the handheld units 200. The elements that allow emergency data from the radio transmitter 30 to be presented at the base unit 100 and the handheld units 200 may be collectively referred to as an alert module.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

We claim:

1. A telephone system having alert module, comprising:
  a base unit having a processor in data communication with a telephone network interface, a radio receiver, a first local transmitter, a first local receiver, a first computer memory having a first program, and a first display; and
  at least one handheld unit having a processor in data communication with a second local receiver, a second local transmitter, a microphone, a speaker, a second computer memory having a second program, and a second display;
  wherein at least one of the first and second programs includes instructions for actuating the telephone network interface, the first local transmitter, the first local receiver, the second local transmitter, and the second local receiver to pass signals between a telephone network on one end and the microphone and the speaker on another end;
  wherein at least one of the first and second programs includes: wherein at least one of the first and second programs includes:
  (a) instructions for actuating the first display, the first local transmitter, the second local receiver, the second display, and the speaker for automatically presenting a first emergency warning through the first display, the second display, and the speaker upon the radio receiver receiving first alert data from an emergency broadcast radio transmitter; and
  (b) instructions for presenting a second emergency warning only upon both: (1) receipt of second alert data from the emergency broadcast radio transmitter; and (2) receipt of a query by at least one of the base unit processor and the handheld unit processor;
  wherein the first alert data is different from the second alert data, and
  wherein the first emergency warning is different from the second emergency warning.

2. The system of claim 1, wherein the first emergency warning is stored in the first computer memory, the first emergency warning being selected using the first alert data from the emergency broadcast radio transmitter.

3. The system of claim 1, wherein the actuation of the speaker for automatically presenting a first emergency warning interrupts the speaker from presenting signals from the telephone network.

4. The system of claim 3, wherein the first emergency warning presented by the first display is selected from the group consisting of:
  (a) an emergency warning comprising the alert data from the emergency broadcast radio transmitter; and
  (b) an emergency warning stored in the first computer memory, the emergency warning being selected using the alert data from the emergency broadcast radio transmitter.

5. The system of claim 4, wherein:
  the first input device includes at least one item selected from the group consisting of: a button, a knob, and a microphone;
  the second input device includes at least one item selected from the group consisting of: a button, a knob, and a microphone;
  the first display includes at least one item selected from the group consisting of: a visual display and a speaker; and
  the second display includes at least one item selected from the group consisting of: a visual display and a speaker.

6. A telephone system having alert module, comprising:
  a base unit having a processor in data communication with a telephone network interface, a radio receiver, a first local transmitter, a first local receiver, and a first computer memory having a first program; and
  at least one handheld unit having a processor in data communication with a second local receiver, a second local transmitter, a microphone, a speaker, and a second computer memory having a second program;
  wherein at least one of the first and second programs includes instructions for passing signals between a telephone network on one end and the microphone and the speaker on another end using the telephone network interface, the first local transmitter, the first local receiver, the second local transmitter, and the second local receiver;
  wherein at least one of the first and second programs includes instructions for utilizing the radio receiver, the first local transmitter, the second local receiver, and the speaker for presenting an emergency warning through the speaker upon the radio receiver receiving alert data from an emergency broadcast radio transmitter;
  wherein the instructions for utilizing include:
    (a) instructions for actuating the speaker for automatically presenting a first emergency warning upon receipt of first alert data from the emergency broadcast radio transmitter; and
    (b) instructions for presenting a second emergency warning only upon both: (1) receipt of second alert data from the emergency broadcast radio transmitter; and (2) receipt of a query by at least one of the base unit processor and the handheld unit processor;

wherein the first alert data is different from the second alert data, and wherein the first emergency warning is different from the second emergency warning.

7. The system of claim 6, wherein the first emergency warning comprises the first alert data from the emergency broadcast radio transmitter.

8. The system of claim 6, wherein the first emergency warning is stored in a database and is selected using the first alert data from the emergency broadcast radio transmitter.

9. The system of claim 6, wherein the speaker is interrupted from presenting signals from the telephone network when the speaker presents the first emergency warning.

10. The system of claim 6, wherein:
the base unit has a first display in data communication with the base unit processor; and
at least one of the first and second programs includes instructions for presenting the first emergency warning through the first display upon receipt of first alert data from an emergency broadcast radio transmitter.

11. The system of claim 10, wherein:
the handheld unit has a second display in data communication with the handheld unit processor; and
at least one of the first and second programs includes instructions for presenting the first emergency warning through the second display upon receipt of first alert data from an emergency broadcast radio transmitter.

12. The system of claim 11, wherein the speaker is interrupted from presenting signals from the telephone network when the speaker presents the first emergency warning.

13. The system of claim 11, wherein:
the base unit includes a first input device in data communication with the base unit processor;
the at least one handheld unit includes a second input device in data communication with the handheld unit processor;
the first program includes instructions for actuating the first display to present emergency data upon receipt of a query input through the first input device, the emergency data being at least one of status information and an emergency warning;
at least one of the first and second programs includes instructions for actuating the first local transmitter, the first local receiver, the second local transmitter, the second local receiver, and the second display to present emergency data upon receipt of a query input through the second input device, the emergency data being at least one of status information and an emergency warning.

14. The system of claim 6, wherein:
the handheld unit has a display in data communication with the handheld unit processor; and
at least one of the first and second programs includes instructions for presenting the first emergency warning through the display upon receipt of first alert data from an emergency broadcast radio transmitter.

15. A telephone system having alert module, comprising:
a base unit having a processor in data communication with a telephone network interface, a radio receiver, a first local transmitter, a first local receiver, a first computer memory, and a first display;
at least one handheld unit having a processor in data communication with a second local receiver, a second local transmitter, a microphone, a speaker, and a second computer memory;
machine-readable instructions causing at least one of the processors to pass signals between a telephone network on one end and the microphone and the speaker on another end using the telephone network interface, the first local transmitter, the first local receiver, the second local transmitter, and the second local receiver; and
machine-readable instructions causing the first display to present an emergency warning upon the radio receiver receiving alert data from an emergency broadcast radio transmitter;
wherein the machine-readable instructions causing the first display to present an emergency warning upon the radio receiver receiving alert data from an emergency broadcast radio transmitter include machine-readable instructions causing:
(a) the first display to automatically present a first emergency warning upon the radio receiver receiving first alert data from the emergency broadcast radio transmitter; and
(b) the first display to present a second emergency warning only upon both: (1) receipt of second alert data from the emergency broadcast radio transmitter; and (2) receipt of a query by at least one of the base unit processor and the handheld unit processor;
wherein the first alert data is different from the second alert data, and
wherein the first emergency warning is different from the second emergency warning.

16. The system of claim 1, wherein the first emergency warning presented by the first display is selected from the group consisting of:
(a) an emergency warning comprising the alert data from the emergency broadcast radio transmitter; and
(b) an emergency warning stored in the first computer memory, the emergency warning being selected using the alert data from the emergency broadcast radio transmitter.

17. The system of claim 16, wherein:
the first input device includes at least one item selected from the group consisting of: a button, a knob, and a microphone;
the second input device includes at least one item selected from the group consisting of: a button, a knob, and a microphone;
the first display includes at least one item selected from the group consisting of: a visual display and a speaker; and
the second display includes at least one item selected from the group consisting of: a visual display and a speaker.

18. The system of claim 1, wherein:
the first input device includes at least one item selected from the group consisting of: a button, a knob, and a microphone;
the second input device includes at least one item selected from the group consisting of: a button, a knob, and a microphone;
the first display includes at least one item selected from the group consisting of: a visual display and a speaker; and
the second display includes at least one item selected from the group consisting of: a visual display and a speaker.

* * * * *